(12) United States Patent
Jadhav et al.

(10) Patent No.: US 10,801,525 B2
(45) Date of Patent: Oct. 13, 2020

(54) HYDRAULIC VALVE WITH PRESSURE LIMITER FUNCTION

(71) Applicant: EATON INTELLIGENT POWER LIMITED, Dublin (IE)

(72) Inventors: Mahesh K. Jadhav, Pune (IN); Nilesh Anant Sutar, Pune (IN); Muzammil Qayyumoddin Quazi, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 63 days.

(21) Appl. No.: 16/244,803

(22) Filed: Jan. 10, 2019

(65) Prior Publication Data
US 2019/0219073 A1  Jul. 18, 2019

(30) Foreign Application Priority Data
Jan. 12, 2018 (IN) .............................. 201811001394

(51) Int. Cl.
| | | |
|---|---|---|
| *F15B 13/02* | (2006.01) | |
| *F15B 13/04* | (2006.01) | |
| *F15B 11/16* | (2006.01) | |
| *F15B 11/05* | (2006.01) | |
| *F16K 31/12* | (2006.01) | |

(52) U.S. Cl.
CPC .......... *F15B 13/026* (2013.01); *F15B 11/055* (2013.01); *F15B 11/163* (2013.01); *F15B 11/165* (2013.01); *F15B 13/0401* (2013.01); *F15B 13/0416* (2013.01); *F16K 31/12* (2013.01); *F15B 2211/3054* (2013.01); *F15B 2211/40569* (2013.01); *F15B 2211/50554* (2013.01); *F15B 2211/5153* (2013.01); *F15B 2211/55* (2013.01); *F15B 2211/65* (2013.01)

(58) Field of Classification Search
CPC ..... F15B 11/055; F15B 11/163; F15B 11/165; F15B 11/166; F15B 13/206; F15B 13/0416
See application file for complete search history.

(56) References Cited

U.S. PATENT DOCUMENTS

| | | | | |
|---|---|---|---|---|
| 7,434,393 | B2 * | 10/2008 | Hesse ................... | E02F 9/2296 60/422 |
| 7,818,966 | B2 * | 10/2010 | Pack .................... | F15B 11/163 60/422 |
| 9,027,589 | B2 | 5/2015 | Coolidge | |

(Continued)

OTHER PUBLICATIONS

"Introducing the Eaton® CLS Load Sensing Sectional Mobile Valve", Eaton, 2015, 18 pages.

(Continued)

*Primary Examiner* — Michael Leslie
(74) *Attorney, Agent, or Firm* — Merchant & Gould PC

(57) ABSTRACT

A hydraulic system includes first and second valve assemblies connected to a common pump. The first valve assembly includes a main valve housed inside a manifold. A pressure compensator valve maintains a constant pressure drop across a variable orifice of the main valve. A pressure limiter valve is in communication with the main valve and the pressure compensator valve, and allows an actuator connected to the first valve assembly to operate independently of the second valve assembly so that fluid flow to a work port of the first valve assembly is not interrupted by operation of the second valve assembly.

15 Claims, 10 Drawing Sheets

(56) References Cited

U.S. PATENT DOCUMENTS

| | | | |
|---|---|---|---|
| 9,200,647 B2* | 12/2015 | Jadhav | F15B 13/0417 |
| 10,024,342 B2* | 7/2018 | Terao | F15B 11/162 |
| 10,422,110 B2* | 9/2019 | Hatanaka | F15B 11/163 |
| 2018/0180066 A1* | 6/2018 | Rygaard Hansen | F15B 21/008 |

OTHER PUBLICATIONS

"Eaton® CLS Load Sense Sectional Mobile Valve CLS 100, CLS 180, CLS 250, CLS 350", Eaton, 2016, 4 pages.

\* cited by examiner

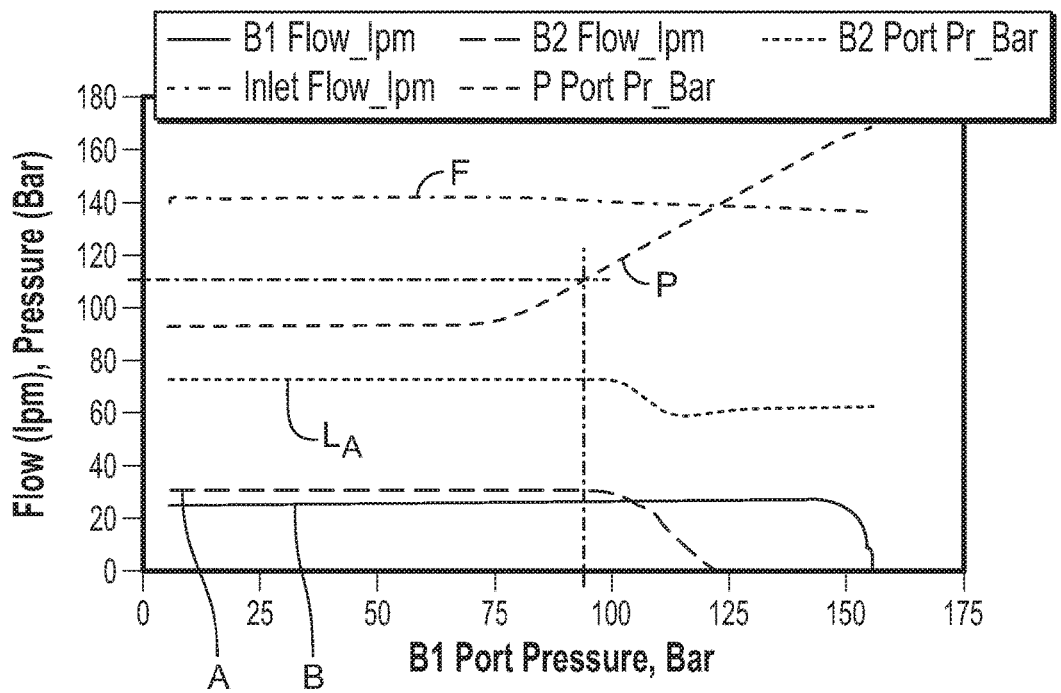
FIG. 1 - (Prior Art)
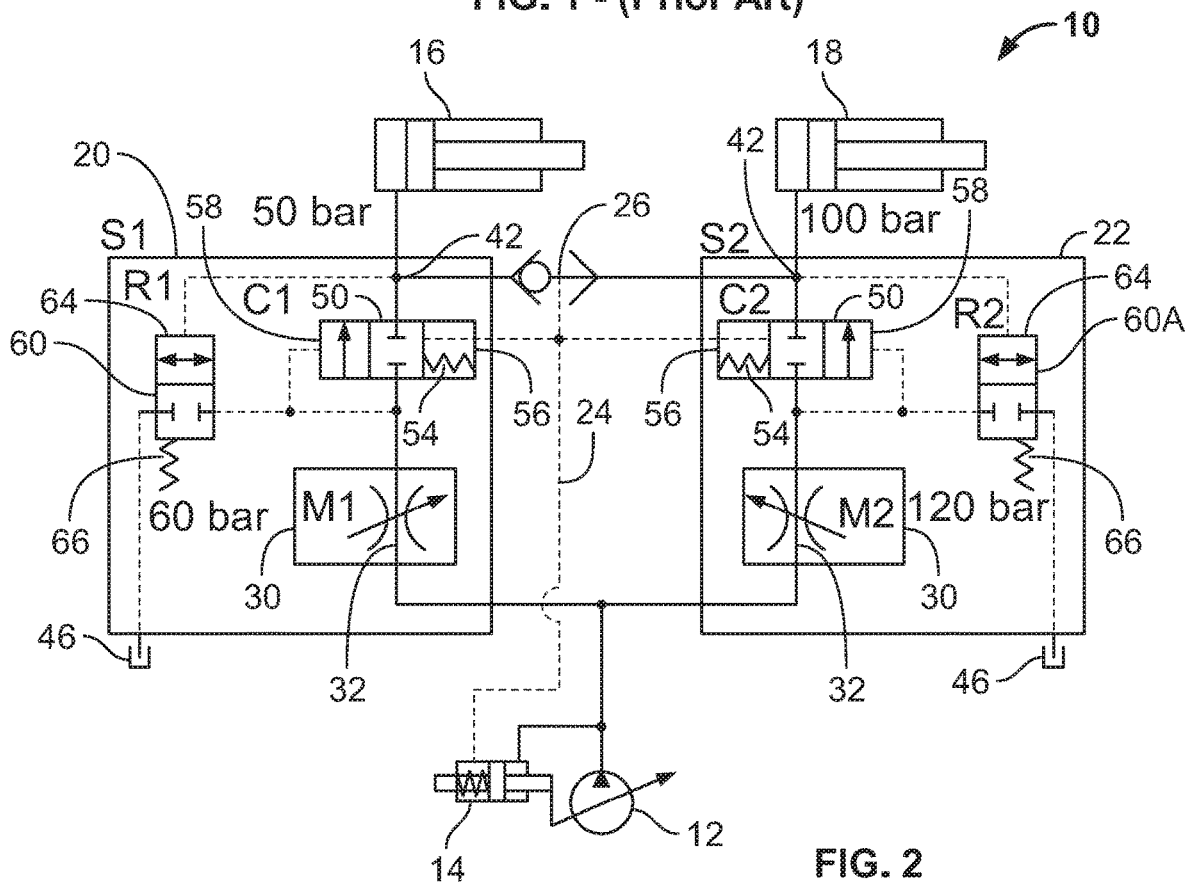
FIG. 2

HYDRAULIC VALVE WITH PRESSURE LIMITER FUNCTION

CROSS-REFERENCE TO RELATED APPLICATIONS

The present application claims the benefit of Indian Provisional Patent Application Serial No. 201811001394, entitled HYDRAULIC VALVE WITH PRESSURE LIMITER FUNCTION, filed on Jan. 12, 2018, the disclosure of which is hereby incorporated by reference in its entirety.

BACKGROUND

Hydraulic systems used in various applications often include various valve assemblies each having different variable requirements and each operating its own actuator under different operating conditions. A load sensing compensator can be used to tailor the operation of a hydraulic pump to meet the variable flow requirements of a given hydraulic system based on load sense pressure. However, the inlet pump pressure received by each valve assembly is based only on the highest load sense pressure sensed by the load sensing compensator. Thus, inlet pump pressure supplied to each valve assembly is the same even though the various valve assemblies may be operating different actuators under different load pressures. Improvements in pump flow management in a hydraulic system having multiple valve assemblies are desired.

SUMMARY

The disclosed technology relates generally to a valve assembly for connecting to a pump having load sensing functionality. In certain examples, the pump is a variable displacement pump. In other examples, the pump is a fixed displacement pump having an inlet pressure compensator.

In one aspect, the valve assembly comprises: a manifold; a main valve housed inside the manifold, the main valve having a variable orifice; a pressure compensator valve adapted to maintain a constant pressure drop across the variable orifice and to communicate fluid from the variable orifice to a work port; and a pressure limiter valve in communication with the main valve and the pressure compensator valve. The pressure limiter valve being biased by a threshold relief pressure and having a pilot surface that receives a local load sense pressure from the work port. The pressure limiter valve drains fluid from the pressure compensator valve to tank when the local load sense pressure overcomes the threshold relief pressure of the pressure limiter valve. The pressure limiter valve maintains flow to the work port when the valve assembly is part of a hydraulic system having multiple valve assemblies, and at least one other valve assembly of the multiple valve assemblies has a higher threshold relief pressure and is operating under a higher load sense pressure than the valve assembly.

In some examples, the pressure limiter valve includes a spool moveable between a first position and a second position. The first position directs fluid from the variable orifice of the main valve to a pilot surface of the pressure compensator valve, and the second position drains fluid from the pilot surface of the pressure compensator valve to tank. The pilot surface of the pressure limiter valve is on a first side of the spool, and a biasing element is positioned next to an opposite second side of the spool for biasing the spool into the first position by the threshold relief pressure. The spool slides into the second position when the local load sense pressure received by the pilot surface of the pressure limiter valve overcomes the threshold relief pressure.

In certain examples, the pressure limiter valve is a two way two position valve having a spool moveable between a closed position and an open position, the spool having a pilot surface that receives the local load sense pressure as a pilot pressure. The local load sense pressure moves the spool of the pressure limiter valve from the closed position to the open position. The closed position blocks fluid from draining to tank, and the open position drains fluid to tank.

In certain examples, the pressure limiter valve is a three way two position valve having a spool moveable between a first position and a second position, the spool having a pilot surface that receives the local load sense pressure as a pilot pressure. The local load sense pressure moves the spool of the pressure limiter valve from the first position to the second position. The first position communicates fluid to a pilot surface of the pressure compensator valve, and the second position drains fluid to tank. In some examples, the pilot surface of the pressure limiter valve has a rounded or conical shape.

In another aspect, the disclosed technology relates to a hydraulic system comprising: a pump; a load sensing compensator mounted to the pump; a first valve assembly housed in a manifold and connected to the pump and to a first actuator, the first valve assembly adapted to communicate a first load sense pressure to the load sensing compensator, the first valve assembling including: a main valve having a variable orifice; a pressure compensator valve adapted to maintain a constant pressure drop across the variable orifice and to communicate fluid from the variable orifice to a work port; and a pressure limiter valve in communication with the main valve and the pressure compensator valve. The pressure limiter valve being biased by a first threshold relief pressure, and includes a pilot surface that receives the first load sense pressure from the work port. The pressure limiter valve drains fluid from the pressure compensator valve to tank when the first load sense pressure overcomes the threshold relief pressure. The hydraulic system further includes a second valve assembly housed in a separate manifold and connected to the pump and to a second actuator. The second valve assembly is adapted to communicate a second load sense pressure to the load sensing compensator. The second valve assembly includes: a main valve having a variable orifice; a pressure compensator valve adapted to maintain a constant pressure drop across the variable orifice of the main valve; and a pressure relief valve biased by a second threshold relief pressure. In the hydraulic system, flow to the work port of the first valve assembly is maintained when the second threshold relief pressure is higher than the first threshold relief pressure and the second load sense pressure is higher than the first load sense pressure.

In some examples, the pressure limiter valve is a two way two position valve that receives the first load sense pressure as a pilot pressure. The first load sense pressure moves the position of the pressure limiter valve from a closed position to an open position. The closed position blocks fluid from draining to tank, and the open position drains fluid to tank.

In certain examples, the pressure limiter valve is a three way two position valve that receives the first load sense pressure as a pilot pressure. The first load sense pressure is adapted to move the position of the pressure limiter valve from a first position to a second position. The first position communicates fluid to a pilot surface of the pressure compensator valve, and the second position drains fluid to tank.

In some examples, the pilot surface of the pressure limiter valve in the first valve assembly has a rounded or conical shape.

In another aspect, the disclosed technology relates to a valve assembly for connecting to a pump having load sensing functionality, the valve assembly comprising: a manifold; a main valve housed inside the manifold, the main valve including: a variable orifice having an opening proportional to a position of a spool inside the main valve; a pressure compensator valve adapted to maintain a constant pressure drop across the variable orifice of the main valve, the pressure compensator valve including: a spool being moveable between at least an open position and a closed position, the closed position blocks fluid from the variable orifice of the main valve, the open position communicates fluid from the variable orifice to a work port, the work port adapted to connect to an actuator, the spool having a pilot surface on a first side opposite a second side of the spool; and a biasing element positioned inside a biasing chamber next to the second side of the spool for biasing the spool into the closed position, the biasing chamber adapted to receive a load sense pressure from a second valve assembly via a load sense line, the load sense pressure applying an additional biasing force for moving the pressure compensator valve into the closed position; and a pressure limiter valve in fluid communication with the main valve and the pressure compensator valve, the pressure limiter valve including: a spool moveable between at least a first position and a second position, the first position directs fluid from the variable orifice of the main valve to the pilot surface of the spool of the pressure compensator valve, the second position drains fluid from the pilot surface of the spool of the pressure compensator valve to tank, the spool of the pressure limiter valve having a pilot surface on a first side of the spool opposite a second side of the spool, the pilot surface adapted for receiving a local load sense pressure from the work port; and a biasing element positioned next to the second side of the spool for biasing the spool into the first position by a threshold relief pressure, the spool being adapted to move into the first position when the local load sense pressure received by the pilot surface overcomes the threshold relief pressure. The pressure limiter valve maintains flow to the work port when the valve assembly is part of a hydraulic system having multiple valve assemblies, and when at least one other valve assembly of the multiple valve assemblies has a threshold relief pressure that is higher than the threshold relief pressure of the pressure limiter valve, and the at least one other valve is operating under a load sense pressure that is higher than the load sense pressure of the valve assembly.

In certain examples, the pressure limiter valve is a two way two position valve. In other examples, the pressure limiter valve is a three way two position valve. In some examples, the pilot surface of the pressure limiter valve has a rounded or conical shape. In some examples, a hydraulic system comprises multiple valve assemblies, wherein at least one valve assembly is the valve assembly describe above.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 1 illustrates fluid flow in two post compensated valve assemblies included in a hydraulic system, each valve assembly having a local load sense relief valve.

FIG. 2 depicts a hydraulic circuit in accordance with a first example of the present disclosure, the hydraulic circuit having multiple valve assemblies each connected to an actuator and each having a two way two position pressure limiter valve.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

A hydraulic system may include multiple valve assemblies each connected to a pump and each operating its own actuator under a different load sense pressure. In FIG. 1, the flow A in a first valve assembly is compared with the flow B in a second valve assembly as the inlet pump pressure P from the pump increases. The inlet flow F is shown as remaining relatively constant while the inlet pump pressure P of the pump increases. The load sense pressure LA of the first valve assembly is shown as remaining relatively constant as the inlet pump pressure P increases. However, the flow A in the first valve assembly begins to decrease when the inlet pump pressure P begins to increase and eventually reaches zero before the flow B in the second valve assembly begins to decrease. This may be due to a local relief valve in the first valve assembly having a threshold relief pressure that is less than the threshold pressure of a local relief valve in the second valve assembly. Since each local relief valve opens and closes based on the same inlet pump pressure from the pump, the flow A in the first valve assembly is cut off before the flow B in the second valve assembly is cut off. This may occur even though the work port pressure in the first valve assembly has not exceeded the threshold relief pressure of the local relief valve in that assembly. Thus, operation of an actuator connected to the first valve assembly is affected which may result in energy loss in the hydraulic system having the first and second valve assemblies.

Figure 3:
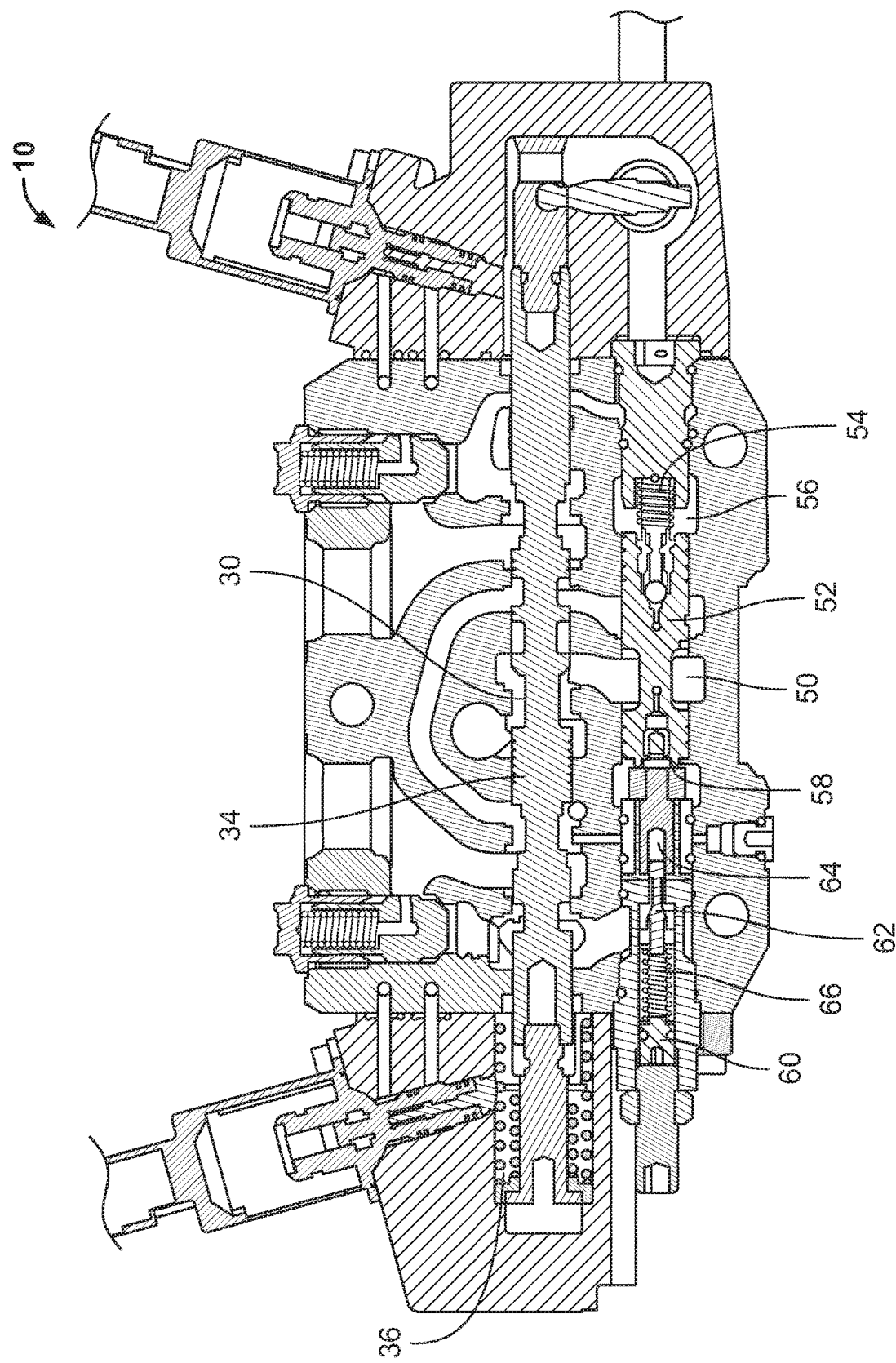
FIG. 3 depicts a structural arrangement of the hydraulic circuit of FIG. 2.

As shown in FIGS. 2 and 3, a hydraulic system 10 includes multiple valve assemblies such as valve assemblies S1, S2 each housed in a separate manifold such as manifolds 20, 22. Each valve assembly S1, S2 is connectable to a pump 12 for receiving a common inlet pump pressure and each assembly is connectable to a separate actuator such as actuators 16, 18. In certain examples, the pump 12 is a variable displacement pump. In other examples, the pump 12 is a fixed displacement pump having an inlet pressure compensator.

A load sense compensator 14 is mounted to the pump 12 for controlling the inlet pump pressure of the pump 12 based on a load sense pressure. The load sense compensator 14 receives a load sense pressure from a load sense line 24 connected to a shuttle valve 26. The shuttle valve 26 is connected to one or more work ports 42 of the valve assemblies S1, S2. The shuttle valve 26 is adapted to open in the direction of the work port having the highest load sense pressure. In some alternative examples, check valves can be used instead of the shuttle valve 26 to do this function. Also, the figures depict the hydraulic system 10 as having two valve assemblies S1, S2, however, it is to be understood that the hydraulic system 10 may include more than two valve assemblies or may include a single valve assembly.

Each valve assembly S1, S2 includes a main valve 30 connected to the pump 12 for receiving hydraulic fluid. Each main valve 30 has a variable orifice 32 whose opening is proportional to the movement of a spool 34 within the main valve 30. In some examples, the position of the spool 34 in the main valve 30 may be controlled by a solenoid coil 36. In other examples, other methods may be used to control the position of the spool 34.

Each valve assembly S1, S2 includes a pressure compensator valve 50 for maintaining a constant pressure drop across the variable orifice 32 so that output flow from the main valve 30 is dependent only on the metering orifice size created by the movement of the spool 34 within the main valve 30. The pressure compensator valve 50 has a spool 52 that is moveable between a closed position and an opened position. In the closed position, fluid from the variable orifice 32 of the main valve 30 is blocked. In the open position, fluid from the variable orifice 32 is communicated to a work port 42 connected to an actuator 16, 18.

The pressure compensator valve 50 is biased in the closed position by a biasing element 54 housed in a biasing chamber 56 and disposed at one end of the spool 52 of the pressure compensator valve 50. A pilot surface 58 disposed at an opposite end of the biasing element 54 receives an inlet pump pressure from the pump 12 for overcoming the biasing force of the biasing element 54 and thereby moving the pressure compensator valve 50 from the closed position to the open position.

Still referring to FIGS. 2 and 3, each valve assembly S1, S2 is depicted as having a pressure limiter valve 60 in fluid communication with the main valve 30 and the pressure compensator valve 50 inside the manifolds 20, 22. The pressure limiter valve 60 includes a spool 62 moveable between an open position and a closed position. In the closed position, fluid from the variable orifice 32 of the main valve 30 is blocked. In the open position, fluid from the pilot surface 58 of the spool 52 in the pressure compensator valve 50 is drained to a tank 46. A biasing element 66 is positioned next to an end of the spool 62 for biasing the spool 62 into the closed position by a threshold biasing force. In certain examples, the biasing element 66 is a spring. The spool 62 of the pressure limiter valve 60 has a pilot surface 64 on an opposite end of the spool. The pilot surface 64 is adapted to receive a work port pressure from the work port 42. The spool 62 is adapted to move into the open position when the work port pressure received by the pilot surface 64 overcomes the threshold biasing force of the biasing element 66. In the example depicted in FIGS. 2 and 3, each pressure limiter valve 60 is a two way two position valve.

The pressure limiter valves 60 are each biased by a different threshold relief pressure. For example, the pressure limiter valve 60 in valve assembly S2 is biased by a threshold relief pressure (e.g., 120 bar) greater than the threshold relief pressure (e.g., 60 bar) of the pressure limiter valve 60 in valve assembly S1. The different threshold relief pressures are desirable depending on the characteristics of each valve assembly including the requirements of the actuators (e.g., actuators 16, 18) connected to the valve assemblies.

Each valve assembly S1, S2 may operate independently of the other valve assembly such that each valve assembly may operate under a different load sense pressure. For example, the actuator 18 connected to the second valve assembly S2 may be working under a load sense pressure (e.g., 100 bar) that is greater than the load sense pressure (e.g., 50 bar) of the actuator 16 connected to the first valve assembly S1. In the example depicted in FIG. 2, the load sense pressure in the second valve assembly S2 is greater than the load sense pressure in the first valve assembly S1 such that the shuttle valve 26 is positioned to communicate the load sense pressure from the second valve assembly S2 to the load sense line 24 and to block the load sense pressure from the first valve assembly S1 from entering the load sense line 24. The load sense line 24 communicates the load sense pressure from the second valve assembly S2 to the load sense compensator 14. The load sense line also communicates the load sense pressure from the second valve assembly S2 to the biasing chambers 56 in each valve assembly S1, S2. The inlet pump pressure from the pump 12 will increase as the load sense pressure in the second valve assembly S2 increases in order to match the increased demand for pressure.

Figure 4:
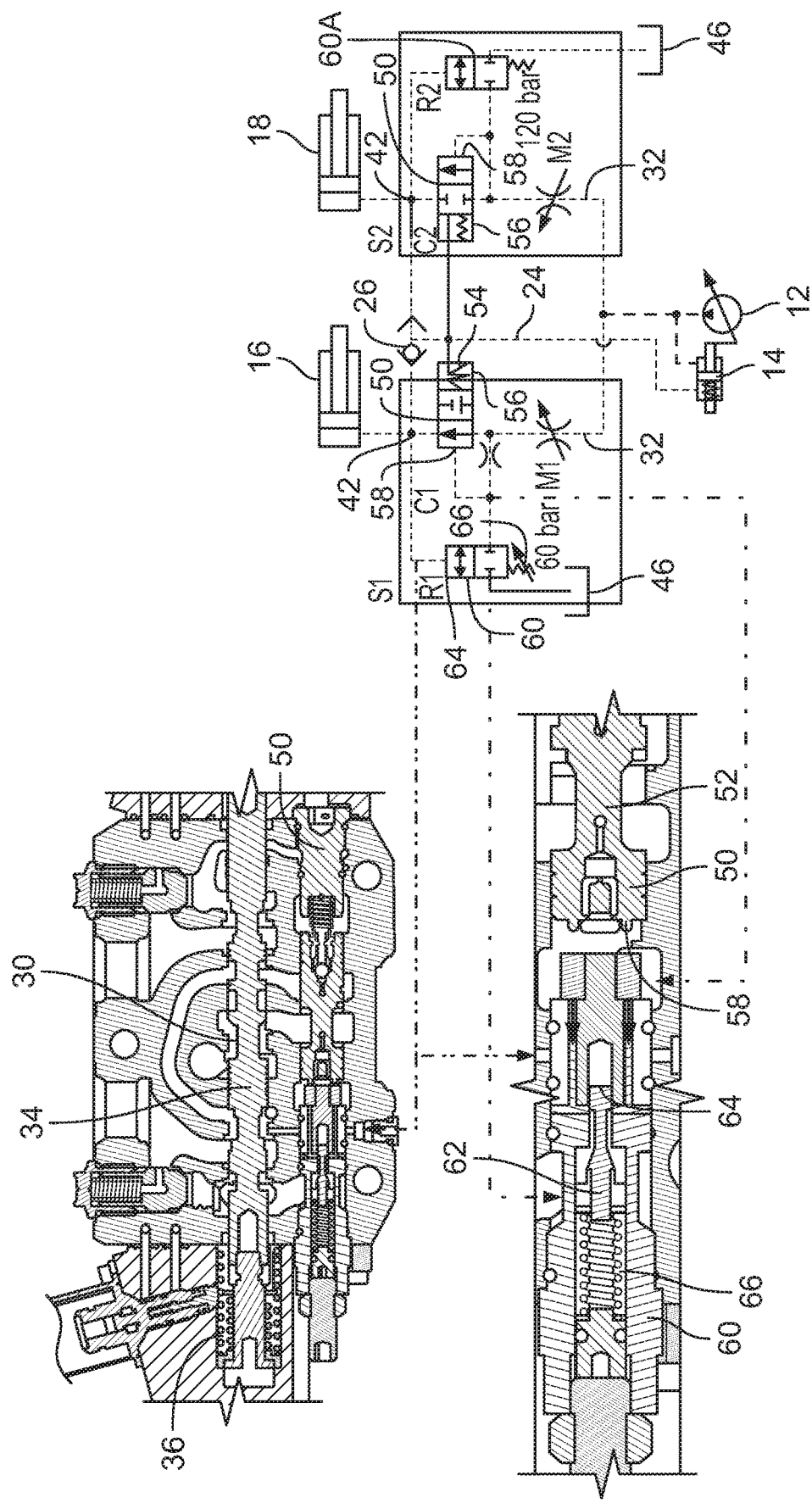
FIG. 4 depicts the hydraulic circuit of FIG. 2 when a work load pressure in a first valve assembly is less than a threshold relief pressure of the pressure limiter valve.

Referring now to FIGS. 2 and 4, the opening and closing of the pressure limiter valve 60 in the first valve assembly S1 is independent of the inlet pump pressure from the pump 12. The pressure limiter valve 60 in the first valve assembly S1 will remain closed so long as the actuator 16 connected to the first valve assembly S1 has a load sense pressure below the threshold relief pressure (e.g., 60 bar) in the first valve assembly S1. When the pressure limiter valve 60 is in the closed position, the inlet pump pressure from the pump 12 is directed to the pilot surface 58 of the pressure compensator valve 50 for moving the pressure compensator valve 50 to the open position by overcoming the combined force of the biasing element 54 and the load sense pressure from the second valve assembly S2 that is communicated to the biasing chamber 56 that houses the biasing element 54. When the pressure compensator valve 50 is in the open position, fluid flow is communicated to the actuator 16 connected to the first valve assembly S1.

The fluid flow to the actuator 16 connected to the first valve assembly S1 will not be cut off even if the threshold relief pressure (e.g., 60 bar) in the first valve assembly S1 is less than threshold relief pressure (e.g., 120 bar) in the second valve assembly S2. Thus, the operation of the actuator 16 connected to the first valve assembly S1 is not affected by the operation of the second valve assembly S2 which may cause the inlet pump pressure to exceed the lower threshold relief pressure (e.g., 60 bar) of the first valve assembly S1.

Figure 5:
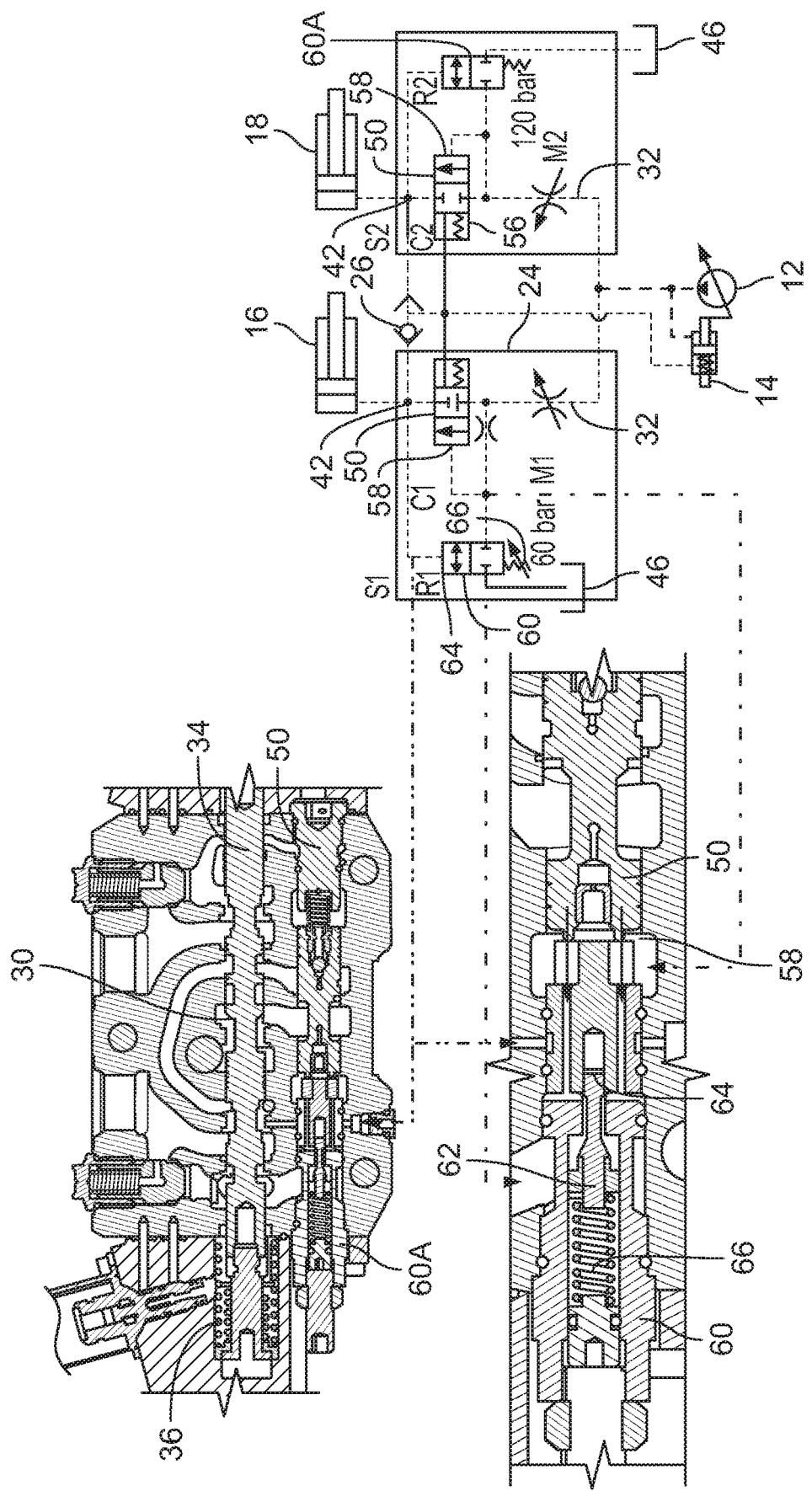
FIG. 5 depicts the hydraulic circuit of FIG. 2 when a work load pressure in a first valve assembly is greater than a threshold relief pressure of the pressure limiter valve.

Referring now to FIGS. 2 and 5, when the load sense pressure from the actuator 16 exceeds the threshold relief pressure (e.g., 60 bar) of the first valve assembly S1, the pressure limiter valve 60 in the first valve assembly S1 will move to the open position. For example, the load sense pressure from the actuator 16 detected at the work port 42 is communicated to the pilot surface 64 of the spool 62 in the pressure limiter valve 60, and overcomes the biasing force of the biasing element 66. When the load sense pressure overcomes the threshold relief pressure of the biasing element 66, the pressure limiter valve 60 will move to the open position and the inlet pump pressure that is communicated to the pilot surface 58 of the pressure compensator valve 50 will be drained to tank 46. This causes the pressure compensator valve 50 to move to the closed position due to the combined force of the biasing element 54 and the load sense pressure from the second valve assembly S2 communicated via the shuttle valve 26 to the biasing chamber 56. When in the closed position, the pressure compensator valve 50 blocks fluid from reaching the actuator 16. Thus, flow to the actuator 16 in the first valve assembly S1 is cut off when the load sense pressure in the first valve assembly S1 exceeds the threshold relief pressure.

Figure 6:
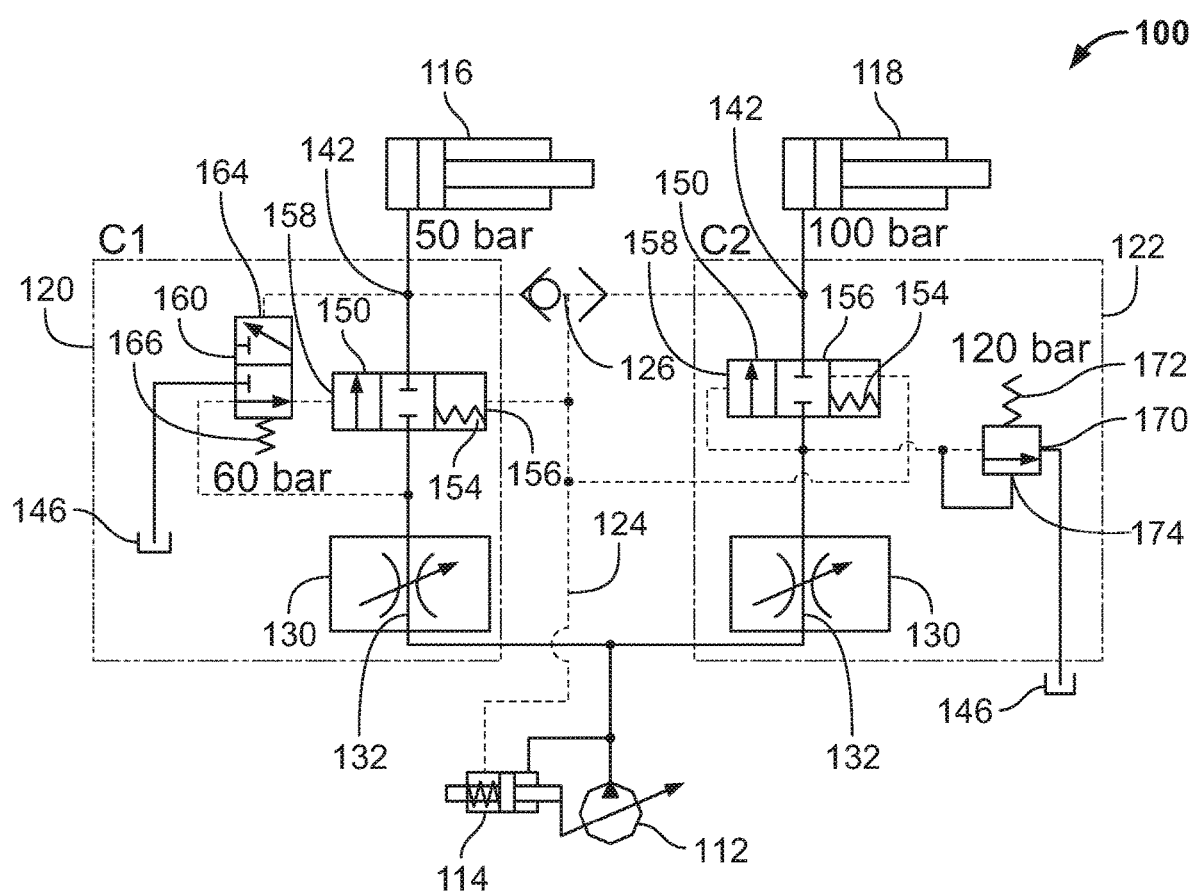
FIG. 6 depicts an alternative example of a hydraulic circuit in accordance with another example of the present disclosure, the hydraulic circuit having multiple valve assemblies, one valve assembly connected to an actuator and having a three way two position pressure limiter valve.
Figure 7:
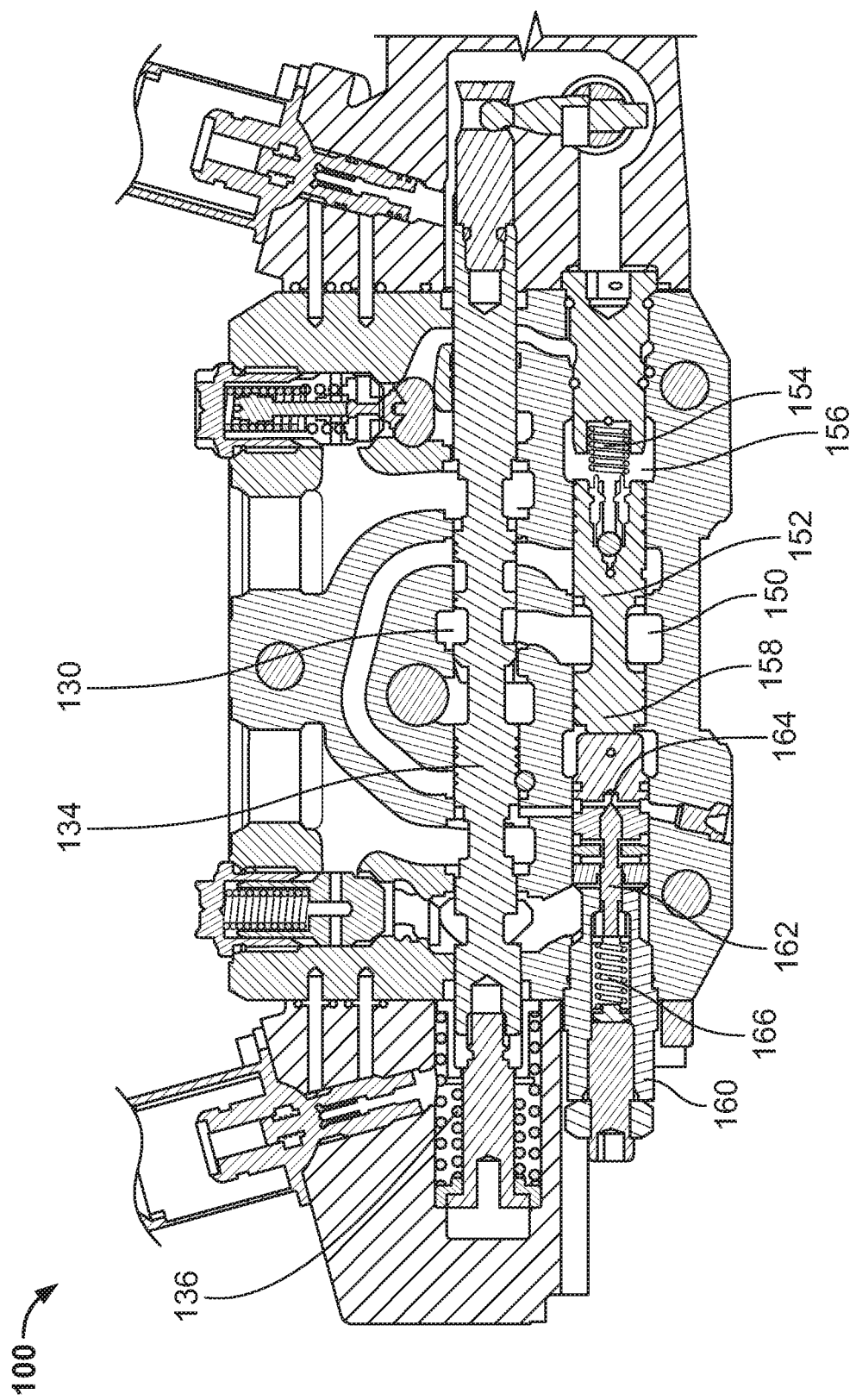
FIG. 7 depicts a structural arrangement of the hydraulic circuit of FIG. 6.

Referring now to FIGS. 6 and 7, an alternative hydraulic system 100 in accordance with the present disclosure may share components and features similar to those describe above with regard to the hydraulic system 10 depicted in FIGS. 2-5. The hydraulic system 100 may include multiple valve assemblies such as valve assemblies C1, C2 each housed in a separate manifold 120, 122. Each valve assembly C1, C2 is connectable to a pump 112 for receiving a common inlet pump pressure and each assembly is connectable to a separate actuator such as actuators 116, 118. In certain examples, the pump 112 is a variable displacement pump. In other examples, the pump 112 is a fixed displacement pump having an inlet pressure compensator.

A load sense compensator 114 is mounted for controlling the inlet pump pressure of the pump 112 based on a load sense pressure. The load sense compensator 114 receives a load sense pressure from a load sense line 124 connected to a shuttle valve 126. The shuttle valve 126 is connected to one or more work ports 142 of the valve assemblies C1, C2. The shuttle valve 126 is adapted to open in the direction of the work port having the highest load sense pressure. In some alternative examples, check valves can be used instead of the shuttle valve 126 to do this function. Also, the figures depict the hydraulic system 100 as having two valve assemblies C1, C2, however, it is to be understood that the hydraulic system 100 may include more than two valve assemblies or may include a single valve assembly.

Each valve assembly C1, C2 includes a main valve 130 connected to the pump 112 for receiving hydraulic fluid. Each main valve 130 has a variable orifice 132 whose opening is proportional to the movement of a spool 134 within the main valve 130. In some examples, the position of the spool 134 may be controlled by a solenoid coil 136. In other examples, other methods may be used to control the position of the spool 134.

Each valve assembly C1, C2 includes a pressure compensator valve 150 for maintaining a constant pressure drop across the variable orifice 132 such that output flow from the main valve 130 is dependent only on the metering orifice size created by the movement of the spool 134 within the main valve 130. The pressure compensator valve 150 has a spool 152 moveable between a closed position and an opened position. In the closed position, fluid from the variable orifice 132 of the main valve 130 is blocked. In the open position, fluid from the variable orifice 132 is communicated to a work port 142 connected to an actuator 116, 118.

The pressure compensator valve 150 is biased into the closed position by a biasing element 154 housed in a biasing chamber 156 and disposed at one end of the spool 152 of the pressure compensator valve 150. A pilot surface 158 disposed at an opposite end of the biasing element 154 receives an inlet pump pressure from the pump 112 for overcoming the biasing force of the biasing element 154 and thereby moving the pressure compensator valve 150 from the closed position to the open position.

Still referring to FIGS. 6 and 7, valve assembly C1 includes a pressure limiter valve 160 in fluid communication with the main valve 130 and the pressure compensator valve 150 inside the manifold 120. The pressure limiter valve 160 includes a spool 162 moveable between a first position and a second position. In the first position, fluid from the variable orifice 132 of the main valve 130 flows through the pressure limiter valve 160 and towards the pilot surface 158 of the pressure compensator valve 150. In the second position, fluid from the pilot surface 158 of the pressure compensator valve 150 is drained to a tank 146. A biasing element 166 is positioned next to an end of the spool 162 for biasing the spool 162 into the first position by a threshold biasing force. In certain examples, the biasing element 166 is a spring. The spool 162 has a pilot surface 164 on an opposite side of the spool. The pilot surface 164 is adapted to receive a work port pressure from the work port 142. The spool 162 is adapted to move into the second position when the work port pressure received by the pilot surface 164 overcomes the threshold biasing force of the biasing element 166. In the example depicted in FIGS. 6 and 7, the pressure limiter valve 160 in valve assembly C1 is a three way two position valve.

In the example depicted in FIG. 6, the valve assembly C2 has a relief pressure valve 170 biased into a closed position by a biasing element 172. The relief pressure valve 170 includes a pilot surface 174 for receiving an inlet pump pressure from the variable orifice 132 of the main valve 130. When the inlet pump pressure exceeds the force of the biasing element 172, the relief pressure valve 170 moves into an open position and the inlet pump pressure is drained to tank 146. This causes the pressure compensator valve 150 in valve assembly C2 to close due to the combined force of the biasing element 154 and the load sense pressure that has entered into the biasing chamber 156 via the shuttle valve 126. It is contemplated that in alternative examples the valve assembly C2 may include a pressure limiter valve 160 similar to one included in valve assembly C1 or a pressure limiter valve 60 similar to the one depicted in FIG. 2.

In the example hydraulic system 100 depicted in FIGS. 6 and 7, the pressure limiter valve 160 and the relief pressure valve 170 are biased by different threshold relief pressures. For example, the relief pressure valve 170 in valve assembly C2 may be biased by a threshold relief pressure (e.g., 120 bar) that is greater than the threshold relief pressure (e.g., 60 bar) of the pressure limiter valve 160 in valve assembly C1. The different threshold relief pressures may be desirable depending on the characteristics of each valve assembly including the requirements of the various actuators (e.g., actuators 116, 118) that may be connected to the valve assemblies.

Each valve assembly C1, C2 may operate independently of the other valve assembly such that each valve assembly may operate under a different load sense pressure. For example, the actuator 118 connected to the second valve assembly C2 may be working under a load sense pressure (e.g., 100 bar) that is greater than the load sense pressure (e.g., 50 bar) of the actuator 116 connected to the first valve assembly C1. In the example depicted in FIG. 6, the load sense pressure in the second valve assembly C2 is greater than the load sense pressure in the first valve assembly C1 such that the shuttle valve 126 is positioned to communicate the load sense pressure from the second valve assembly C2 to the load sense line 124 and to block the load sense pressure from the first valve assembly C1 from entering the load sense line 124. The load sense line 124 communicates the load sense pressure from the second valve assembly C2 to the load sense compensator 114. The load sense line 124 also communicates the load sense pressure from the second valve assembly C2 to the biasing chambers 156 in each valve assembly C1, C2. The inlet pump pressure from the pump 112 will increase as the load sense pressure in the second valve assembly C2 increases in order to match the increased demand for pressure.

Figure 8:
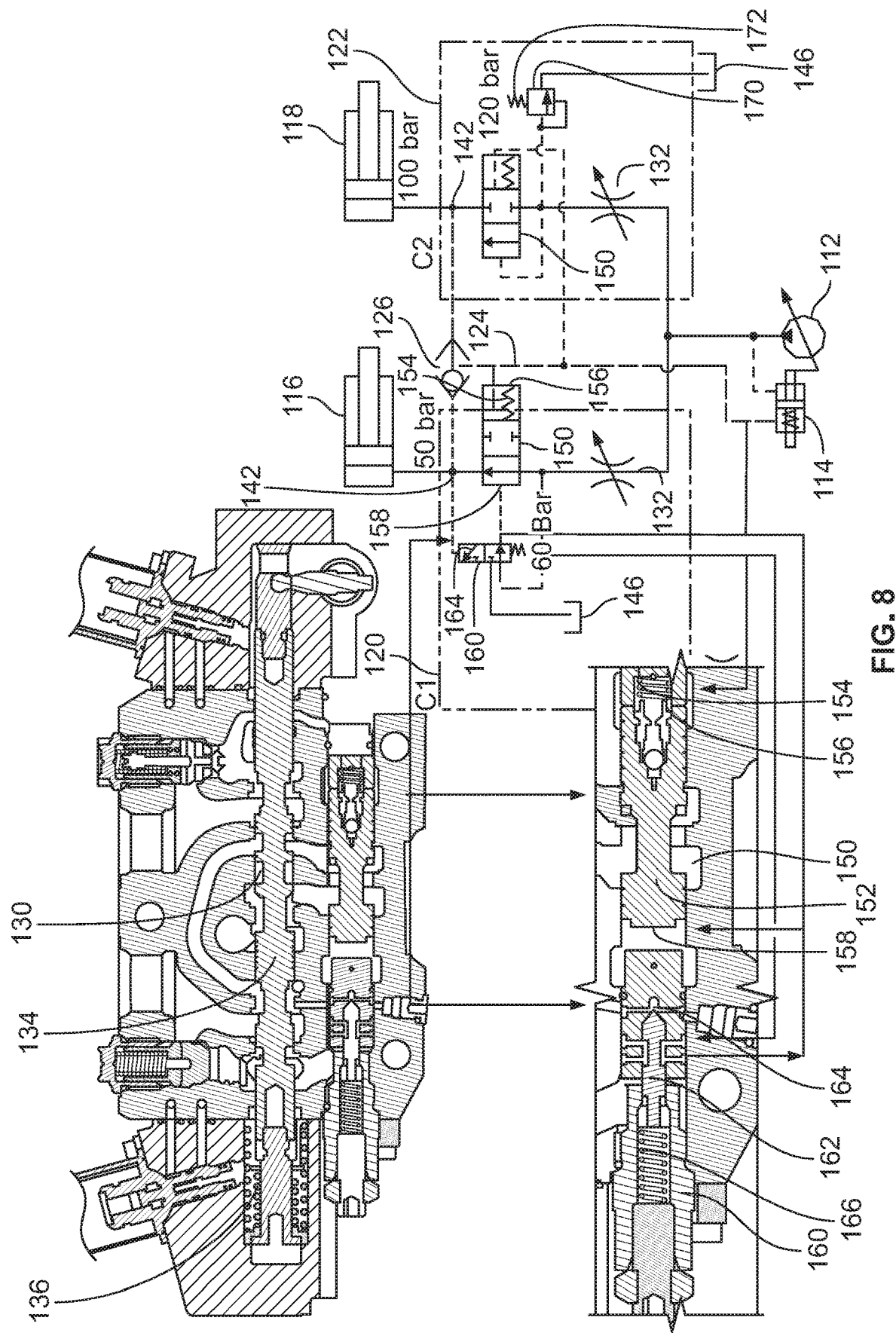
FIG. 8 depicts the hydraulic circuit of FIG. 6 when a work load pressure in a first valve assembly is less than a threshold relief pressure of the pressure limiter valve.

Referring to FIGS. 6 and 8, the movement of the pressure limiter valve 160 in the first valve assembly C1 is independent of the inlet pump pressure. The pressure limiter valve 160 in the first valve assembly C1 remains in the first position while the actuator 116 connected to the first valve assembly C1 has a load sense pressure below the threshold relief pressure (e.g., 60 bar). When in the first position, the inlet pump pressure from the pump 112 flows through the pressure limiter valve 160 toward the pilot surface 158. This moves the pressure compensator valve 150 to the open position by overcoming the force of the biasing element 154 and the load sense pressure from the second valve assembly C2 communicated to the biasing chamber 156. When the pressure compensator valve 150 is in the open position, flow is communicated to the actuator 116 connected to the first valve assembly C1.

The flow to the actuator 116 connected to the first valve assembly C1 will not be cut off even if the threshold relief pressure (e.g., 60 bar) in the first valve assembly C1 is less than threshold relief pressure (e.g., 120 bar) in the second valve assembly C2. Thus, operation of the actuator 116 connected to the first valve assembly C1 is not affected by the operation of the second valve assembly C2 which may cause the inlet pump pressure to exceed the lower threshold relief pressure (e.g., 60 bar) of the first valve assembly C1.

Figure 9:
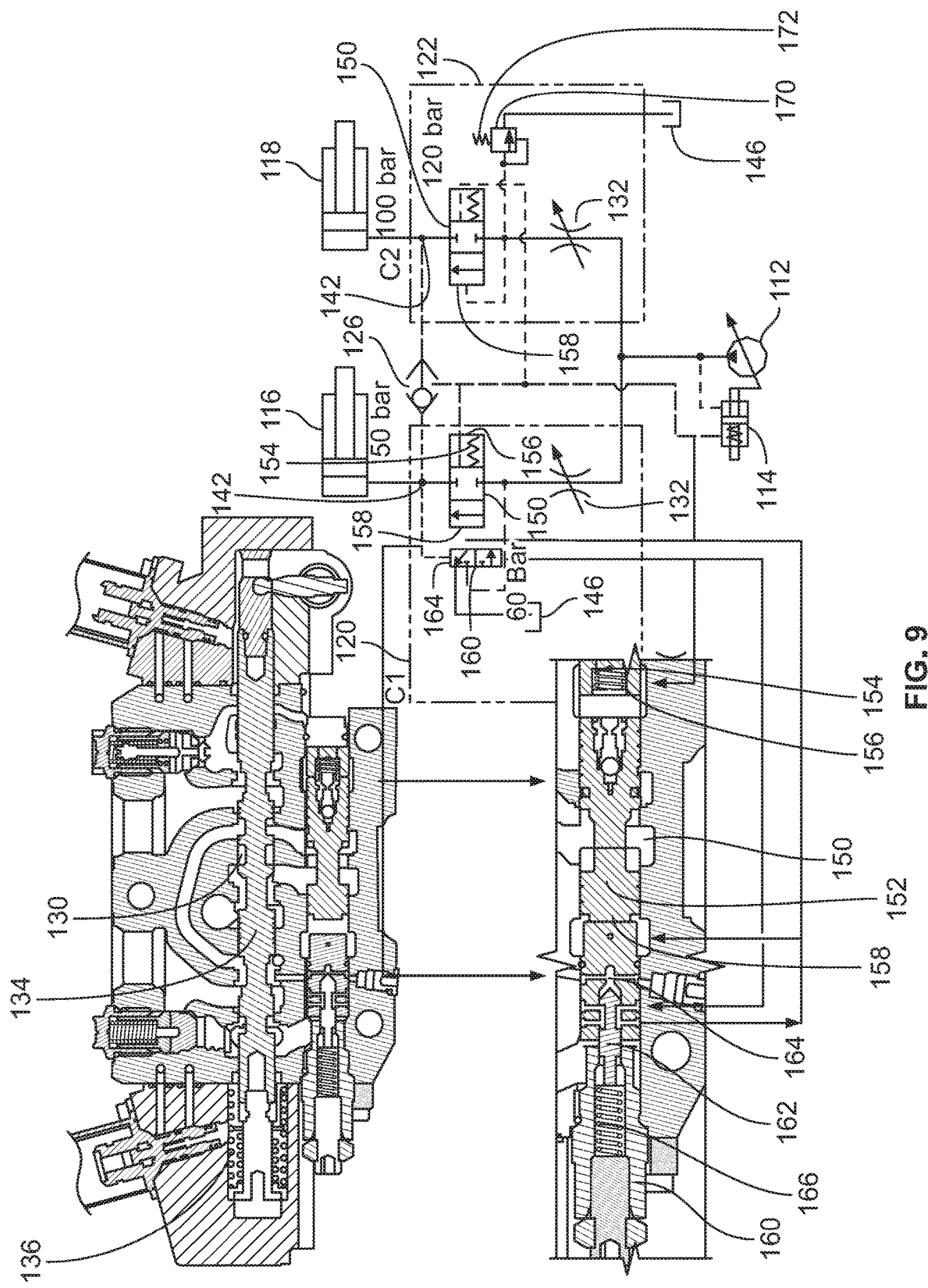
FIG. 9 depicts the hydraulic circuit of FIG. 6 when a work load pressure in a first valve assembly is greater than a threshold relief pressure of the pressure limiter valve.

Referring now to FIGS. 6 and 9, when the load sense pressure from the actuator 116 exceeds the threshold relief pressure (e.g., 60 bar) of the first valve assembly C1, the pressure limiter valve 60 in the first valve assembly C1 will move to the second position. For example, the load sense pressure from the actuator 116 detected at the work port 142 is communicated to the pilot surface 164 of the spool 162 in the pressure limiter valve 160, and overcomes the biasing force of the biasing element 166. When the load sense pressure overcomes the threshold relief pressure of the biasing element 166, the pressure limiter valve 160 will move to the second position and the inlet pump pressure communicated to the pilot surface 158 of the pressure compensator valve 150 will drain to tank 146. This will cause the pressure compensator valve 150 to move to the closed position due to the combined force of the biasing element 154 and the load sense pressure from the second valve assembly C2 that is communicated via the load sense line 124 to the biasing chamber 156. When in the closed position, the pressure compensator valve 150 blocks flow from reaching the actuator 116. Thus, the flow to the actuator 116 is cut off when the load sense pressure in the first valve assembly C1 exceeds the threshold relief pressure.

Figure 10:
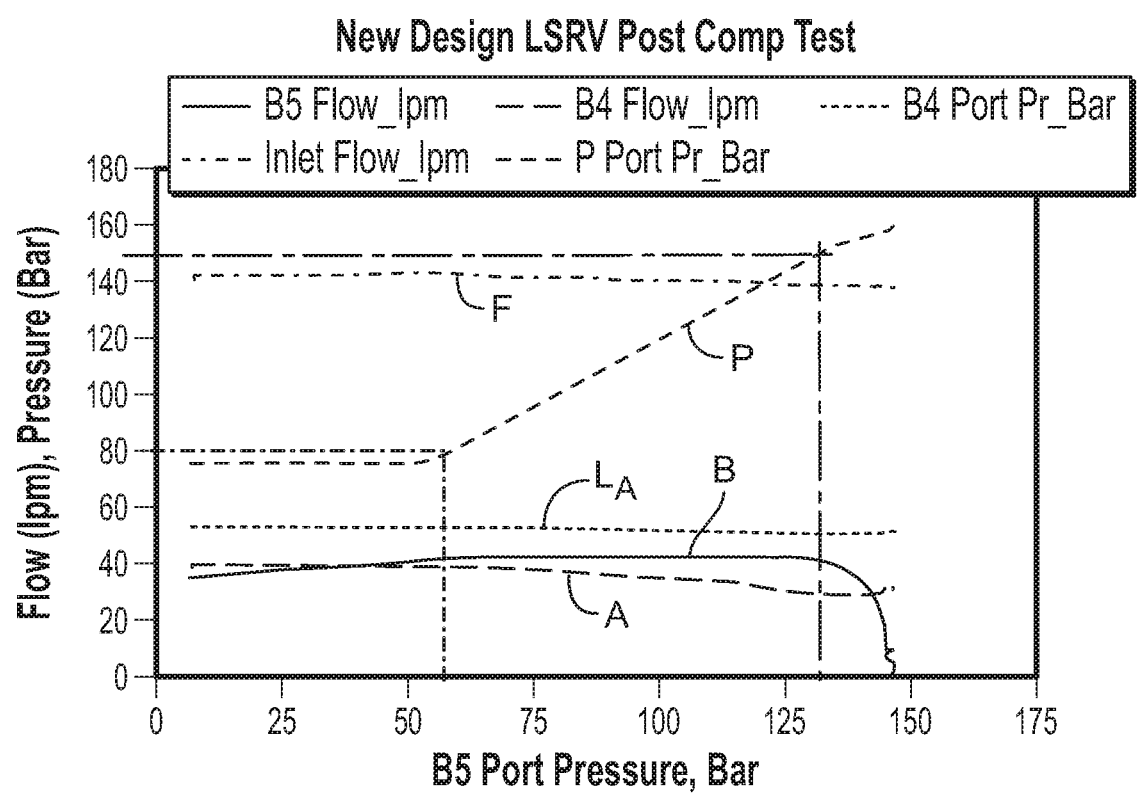
FIG. 10 illustrates fluid flow in two valve assemblies in a hydraulic system in accordance with the present disclosure.

As shown in FIG. 10, the flow A in a first valve assembly S1, C1 in accordance with the present disclosure is compared with the flow B in a second valve assembly S2, C2 as the inlet pump pressure P from a pump increases. The first and second valve assemblies may be included in a hydraulic system such as the ones depicted in FIGS. 2 and 6, and the first valve assembly S1, C1 may have a lower threshold relief pressure than the threshold relief pressure of the second valve assembly S2, C2. FIG. 10 illustrates that the inlet flow F remains relatively constant while the inlet pump pressure P of the pump increases.

The load sense pressure LA of the first valve assembly S1, C1 remains relatively constant as the inlet pump pressure P increases. In accordance with the present disclosure, the flow A in the first valve assembly S1, C1 remains relatively constant as the inlet pump pressure P increases even as the flow B in the second valve assembly S2, C2 decreases. This is due to the flow A in the first valve assembly S1, C1 being independent of the inlet pump pressure and the flow B in the second valve assembly S2, C2. Thus, an actuator connected to the first valve assembly S1, C1 is not affected by an increase in the inlet pump pressure P or the decrease in flow B to an actuator connected to the second valve assembly.

Figure 11:
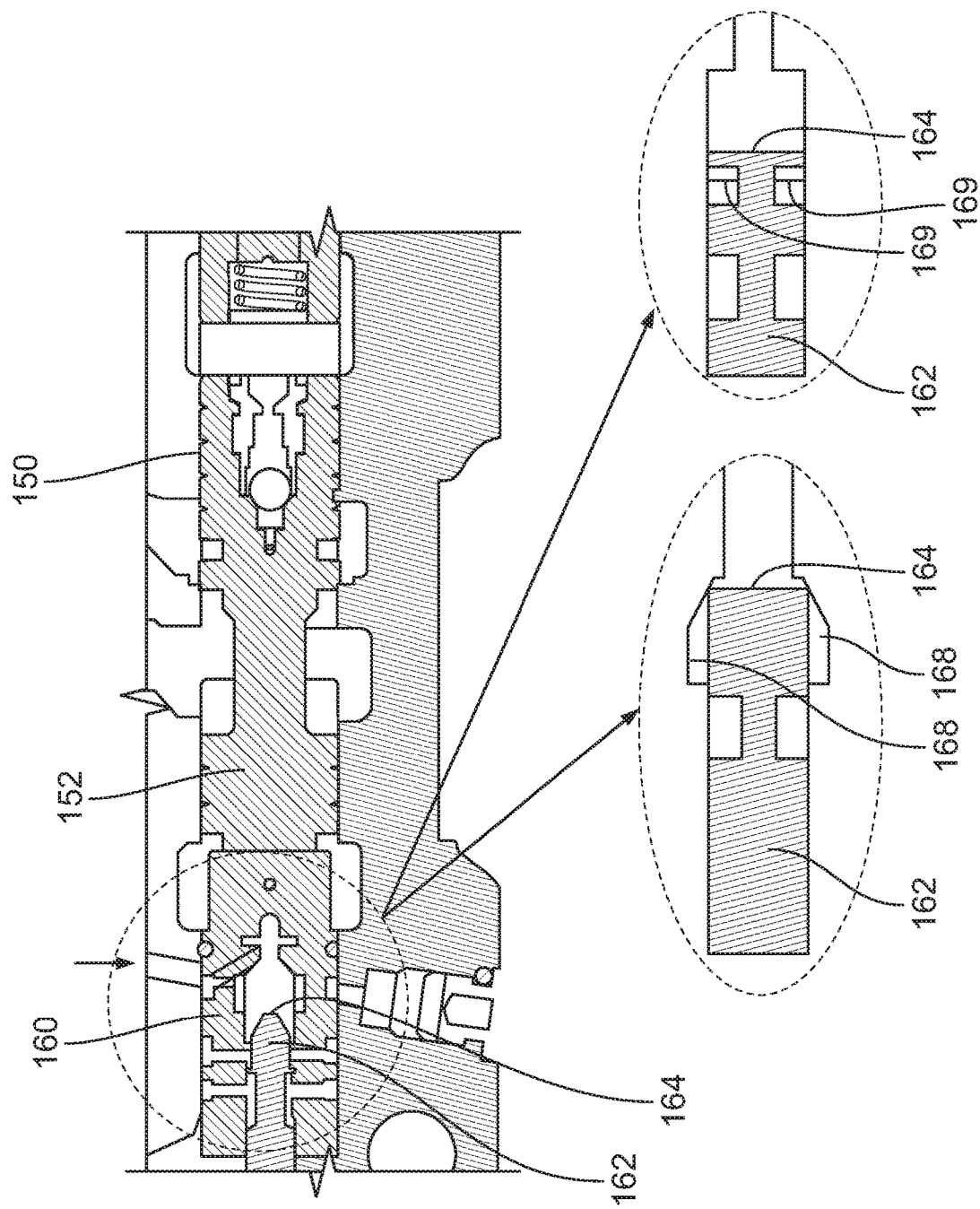
FIG. 11 depicts alternative arrangements for a pilot surface of a three way two position pressure limiter valve depicted in FIGS. 7-9.

Referring now to FIG. 11, the pilot surface 164 of the spool 162 of the three way two position pressure limiter valve shown in FIGS. 7-9 may vary. In certain examples, the shape of the pilot surface 164 may be conical or rounded, as shown in FIG. 11. In other examples, the shape of the spool 162 may be cylindrical such that the pilot surface 164 is a flat surface. In such examples, a seating 168 may be formed in the body of the pressure limiter valve 160, as shown in FIG. 11. In further examples, the seating 168 in the body of the pressure limiter valve 160 can be reduced or avoided by adding dynamic seals 169 on spool 162. The shape of the spool 162 as well as the body of the pressure limiter valve allow the pressure limiter valve 160 to fit within certain constraints as may be needed or desired.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A valve assembly for connecting to a pump having load sensing functionality, the valve assembly comprising:
   a manifold;
   a main valve housed inside the manifold, the main valve having a variable orifice;
   a pressure compensator valve adapted to maintain a constant pressure drop across the variable orifice and to communicate fluid from the variable orifice to a work port; and
   a pressure limiter valve in communication with the main valve and the pressure compensator valve, the pressure limiter valve being biased by a threshold relief pressure and having a pilot surface that receives a local load sense pressure from the work port, wherein the pressure limiter valve drains fluid from the pressure compensator valve to tank when the local load sense pressure overcomes the threshold relief pressure of the pressure limiter valve;

wherein the pressure limiter valve maintains flow to the work port when the valve assembly is part of a hydraulic system having multiple valve assemblies, and when at least one other valve assembly of the multiple valve assemblies has a higher threshold relief pressure and is operating under a higher load sense pressure than the valve assembly.

2. The valve assembly of claim 1, wherein the pressure limiter valve includes a spool moveable between a first position and a second position;

wherein the first position directs fluid from the variable orifice of the main valve to a pilot surface of the pressure compensator valve, and the second position drains fluid from the pilot surface of the pressure compensator valve to tank;

wherein the pilot surface of the pressure limiter valve is on a first side of the spool, and a biasing element is positioned next to an opposite second side of the spool for biasing the spool into the first position by the threshold relief pressure; and wherein the spool slides into the second position when the local load sense pressure received by the pilot surface of the pressure limiter valve overcomes the threshold relief pressure.

3. The valve assembly of claim 1, wherein the pressure limiter valve is a two way two position valve having a spool moveable between a closed position and an open position, the spool having a pilot surface that receives the local load sense pressure as a pilot pressure;

wherein the local load sense pressure moves the spool of the pressure limiter valve from the closed position to the open position;

wherein the closed position blocks fluid from draining to tank, and the open position drains fluid to tank.

4. The valve assembly of claim 1, wherein the pressure limiter valve is a three way two position valve having a spool moveable between a first position and a second position, the spool having a pilot surface that receives the local load sense pressure as a pilot pressure;

wherein the local load sense pressure moves the spool of the pressure limiter valve from the first position to the second position;

wherein the first position communicates fluid to a pilot surface of the pressure compensator valve, and the second position drains fluid to tank.

5. The valve assembly of claim 4, wherein the pilot surface of the pressure limiter valve has a rounded or conical shape.

6. A hydraulic system comprising multiple valve assemblies, wherein at least one valve assembly is the valve assembly of claim 1.

7. A hydraulic system comprising:
a pump;
a load sensing compensator mounted to the pump;
a first valve assembly housed in a manifold and connected to the pump and to a first actuator, the first valve assembly adapted to communicate a first load sense pressure to the load sensing compensator, the first valve assembling including:
a main valve having a variable orifice;
a pressure compensator valve adapted to maintain a constant pressure drop across the variable orifice and to communicate fluid from the variable orifice to a work port; and a pressure limiter valve in communication with the main valve and the pressure compensator valve, the pressure limiter valve being biased by a first threshold relief pressure, and includes a pilot surface that receives the first load sense pressure from the work port, wherein the pressure limiter valve drains fluid from the pressure compensator valve to tank when the first load sense pressure overcomes the threshold relief pressure;

a second valve assembly housed in a separate manifold and connected to the pump and to a second actuator, the second valve assembly adapted to communicate a second load sense pressure to the load sensing compensator, the second valve assembly including:
a main valve having a variable orifice;
a pressure compensator valve adapted to maintain a constant pressure drop across the variable orifice of the main valve; and
a pressure relief valve biased by a second threshold relief pressure;

wherein flow to the work port of the first valve assembly is maintained when the second threshold relief pressure is higher than the first threshold relief pressure and the second load sense pressure is higher than the first load sense pressure.

8. The hydraulic system of claim 7, wherein the pressure limiter valve is a two way two position valve that receives the first load sense pressure as a pilot pressure;

wherein the first load sense pressure moves the position of the pressure limiter valve from a closed position to an open position;

wherein the closed position blocks fluid from draining to tank, and the open position drains fluid to tank.

9. The hydraulic system of claim 7, wherein the pressure limiter valve is a three way two position valve that receives the first load sense pressure as a pilot pressure;

wherein the first load sense pressure is adapted to move the position of the pressure limiter valve from a first position to a second position;

wherein the first position communicates fluid to a pilot surface of the pressure compensator valve, and the second position drains fluid to tank.

10. The hydraulic system of claim 9, wherein the pilot surface of the pressure limiter valve in the first valve assembly has a rounded or conical shape.

11. A valve assembly for connecting to a pump having load sensing functionality, the valve assembly comprising:
a manifold;
a main valve housed inside the manifold, the main valve including:
a variable orifice having an opening proportional to a position of a spool inside the main valve;
a pressure compensator valve adapted to maintain a constant pressure drop across the variable orifice of the main valve, the pressure compensator valve including:
a spool being moveable between at least an open position and a closed position, the closed position blocks fluid from the variable orifice of the main valve, the open position communicates fluid from the variable orifice to a work port, the work port adapted to connect to an actuator, the spool having a pilot surface on a first side opposite a second side of the spool; and
a biasing element positioned inside a biasing chamber next to the second side of the spool for biasing the spool into the closed position, the biasing chamber adapted to receive a load sense pressure from a second valve assembly via a load sense line, the load sense pressure applying an additional biasing force for moving the pressure compensator valve into the closed position; and a pressure limiter valve in fluid communication with the main valve and the pressure compensator valve, the pressure limiter valve including:
- a spool moveable between at least a first position and a second position, the first position directs fluid from the variable orifice of the main valve to the pilot surface of the spool of the pressure compensator valve, the second position drains fluid from the pilot surface of the spool of the pressure compensator valve to tank, the spool of the pressure limiter valve having a pilot surface on a first side of the spool opposite a second side of the spool, the pilot surface adapted for receiving a local load sense pressure from the work port; and
- a biasing element positioned next to the second side of the spool for biasing the spool into the first position by a threshold relief pressure, the spool being adapted to move into the first position when the local load sense pressure received by the pilot surface overcomes the threshold relief pressure;

wherein the pressure limiter valve maintains flow to the work port when the valve assembly is part of a hydraulic system having multiple valve assemblies, and when at least one other valve assembly of the multiple valve assemblies has a threshold relief pressure that is higher than the threshold relief pressure of the pressure limiter valve, and the at least one other valve is operating under a load sense pressure that is higher than the load sense pressure of the valve assembly.

12. The valve assembly of claim 11, wherein the pressure limiter valve is a two way two position valve.

13. The valve assembly of claim 11, wherein the pressure limiter valve is a three way two position valve.

14. The valve assembly of claim 13, wherein the pilot surface of the pressure limiter valve has a rounded or conical shape.

15. A hydraulic system comprising multiple valve assemblies, wherein at least one valve assembly is the valve assembly of claim 11.

* * * * *